US009553988B2

(12) United States Patent
Anisimov et al.

(10) Patent No.: US 9,553,988 B2
(45) Date of Patent: *Jan. 24, 2017

(54) SYSTEM AND METHODS FOR SCHEDULING AND OPTIMIZING INBOUND CALL FLOW TO A CALL CENTER (71) Applicant: GENESYS TELECOMMUNICATIONS LABORATORIES, INC., Daly City, CA (US)

(72) Inventors: Nikolay Anisimov, Concord, CA (US); Sergey Fedorov, Moraga, CA (US); Herbert Ristock, Walnut Creek, CA (US)

(73) Assignee: GENESYS TELECOMMUNICATIONS LABORATORIES, INC., Daly City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/308,668

(22) Filed: Jun. 18, 2014

(65) Prior Publication Data
US 2014/0301543 A1 Oct. 9, 2014

Related U.S. Application Data (63) Continuation of application No. 12/540,607, filed on Aug. 13, 2009, now Pat. No. 8,792,632.

(51) Int. Cl.
*H04M 5/00* (2006.01)
*H04M 3/523* (2006.01)
*G06Q 10/10* (2012.01)

(52) U.S. Cl.
CPC ............ *H04M 3/523* (2013.01); *G06Q 10/10* (2013.01)

(58) Field of Classification Search
USPC ....... 379/265.01–265.14, 266.01–266.1, 309
See application file for complete search history.

(56) References Cited

U.S. PATENT DOCUMENTS

| 5,930,700 | A | * | 7/1999 | Pepper et al. ............. 455/435.3 |
| 6,128,380 | A | | 10/2000 | Shaffer et al. |
| 6,408,062 | B1 | | 6/2002 | Cave |
| 6,553,113 | B1 | | 4/2003 | Dhir et al. |
| 6,661,882 | B1 | | 12/2003 | Muir et al. |
| 6,744,877 | B1 | | 6/2004 | Edwards |

(Continued)

OTHER PUBLICATIONS

Brown, Lawrence, et al., Statistical Analysis of a Telephone Call Center: A Queueing-Science Perspective, Journal of the American Statistical Association, Mar. 2005, vol. 100, No. 469, pp. 36-50.

*Primary Examiner* — William Deane, Jr.
(74) *Attorney, Agent, or Firm* — Lewis Roca Rothgerber Christie LLP (57) ABSTRACT

A method for providing inbound call reservations to a communication center has steps for monitoring service access points into the communication center by reservation software executing from a machine-readable medium, evaluating communicators and potential communicators, and issuing invitations for reserved communication sessions to qualified communicators and potential communicators, the reserved times coordinated according to data pertaining to predicted communication load and resource availability statistics.

23 Claims, 6 Drawing Sheets

(56) References Cited

U.S. PATENT DOCUMENTS

| | | |
|---|---|---|
| 6,771,760 B1 | 8/2004 | Vortman et al. |
| 6,925,442 B1 * | 8/2005 | Shapira et al. ............... 705/7.33 |
| 6,970,829 B1 | 11/2005 | Leamon |
| 7,069,018 B1 * | 6/2006 | Granstam et al. .......... 455/456.1 |
| 7,259,924 B2 | 8/2007 | Wahl et al. |
| 7,620,160 B2 * | 11/2009 | Tidwell et al. ............. 379/88.25 |
| 7,916,858 B1 | 3/2011 | Heller et al. |
| 8,000,461 B2 | 8/2011 | Holder et al. |
| 8,145,526 B2 * | 3/2012 | Redlich ....................... 705/14.46 |
| 8,150,020 B1 | 4/2012 | Blanchard et al. |
| 8,155,297 B1 | 4/2012 | Dhir et al. |
| 8,259,924 B2 * | 9/2012 | Korolev .............. H04M 3/5141 379/265.05 |
| 8,792,632 B2 | 7/2014 | Anisimov et al. |
| 2002/0141561 A1 * | 10/2002 | Duncan et al. ........... 379/220.01 |
| 2004/0008832 A1 | 1/2004 | Mashimo et al. |
| 2004/0013089 A1 | 1/2004 | Taneja et al. |
| 2005/0213742 A1 | 9/2005 | Fukuzawa |
| 2006/0010206 A1 * | 1/2006 | Apacible et al. .............. 709/205 |
| 2006/0167729 A1 * | 7/2006 | Rafter et al. ....................... 705/8 |
| 2006/0265271 A1 | 11/2006 | Sarlay et al. |
| 2007/0116239 A1 | 5/2007 | Jacobi et al. |
| 2008/0235074 A1 | 9/2008 | Sarlay et al. |
| 2008/0306830 A1 | 12/2008 | Lasa et al. |
| 2009/0088168 A1 * | 4/2009 | Varanasi ........................ 455/445 |
| 2009/0097635 A1 | 4/2009 | Abuelsaad et al. |
| 2009/0285380 A1 | 11/2009 | Chen et al. |
| 2010/0161540 A1 | 6/2010 | Anisimov et al. |
| 2011/0038476 A1 | 2/2011 | Anisimov et al. |
| 2011/0251904 A1 * | 10/2011 | Shapira et al. ............ 705/14.73 |

\* cited by examiner

SYSTEM AND METHODS FOR SCHEDULING AND OPTIMIZING INBOUND CALL FLOW TO A CALL CENTER

CROSS REFERENCE TO RELATED APPLICATIONS

This application is a continuation of U.S. patent application Ser. No. 12/540,607, filed on Aug. 13, 2009, the disclosure of which is hereby incorporated by reference in its entirety.

BACKGROUND OF THE INVENTION

1. Field of the Invention

The present invention is in the field of telecommunications including electronic commerce (eCommerce) and electronic services (eServices) and pertains particularly to methods and apparatus for monitoring and ranking visitors to call center access points for the purpose of reserving inbound telephone opportunities for those visitors.

2. Discussion of the State of the Art

In the field of electronic commerce, companies provide Web sites where visitors may, using Internet-capable appliances, browse products, services, and interactive features designed to engage customers in a way that may promote sales through those Web sites or through separate channels associated with those Web sites. Companies also provide or enter contracts with companies who provide call center services that may be reached directly by telephone or indirectly by browsing the company Web sites. In sales, there are many different considerations visited to best determine when a particular customer should be approached and solicited. Therefore, many companies have pre-screening or qualification routines in place and operational at customer access points established for the sales arm of the company that basically work to screen out uninterested persons from taxing the sales process or to direct less interested parties at least to automated self-help systems so that live sales personnel are best utilized in assisting the more highly motivated and qualified potential customers.

The time of the agent is a valuable asset of most contact center systems. Where Web services are in place, there are available widgets that can be provided on Web sites that allow customers to place calls, enter chat rooms, schedule call-backs and the like so that live assistance is always close at hand. For telephone access points like an interactive voice response (IVR) system the pre-screening is performed using the voice application running on the system that interacts with each caller and directs callers whom are not highly motivated to automated services. However, many potential customers that elect live assistance are not actually highly motivated customers. They may elect live assistance when they are merely seeking information or to complain about a product or service, for example. As a result, a lot of time is wasted engaging potential customers that are not qualified or motivated at the time of engagement. In many of these cases redirection to an automated service is the suggested treatment to free up live personnel for better use of time.

The inventor is aware that there are ways to engage or solicit browsing persons at a web page via pop-up or other notification to engage a live agent over a live assistance channel. One consideration that must be made when soliciting many visitors to engage in live interaction is the availability of personnel to handle the added traffic brought in through such activity. In general, a call-in center has peak and slow periods of activity and during peak periods there are often not enough resources (personnel) available to handle the call flow. It is not desirable to solicit a visitor to engage in live assistance and then force the visitor to wait in queue for an unreasonable period of time. Likewise, it is not desirable to have long waiting times for callers who call into the center impromptu who need live assistance.

For Web visitors proactive engagement typically involves pop-up messages inserted into a Web session that invite visitors to establish chat conversations, voice callbacks, or email. Normally contact centers invite web visitors to live assisted conversations when there are enough resources (agents) to process the call without long waiting time.

Sometimes invitations may include inbound toll free numbers to call for immediate live assistance. For IVR interactions callers who elect live services are often dumped into a queue to wait for a next available agent. In an embodiment of the present invention, inviting visitors to accept a scheduled call back is one way to divert traffic to a later time where resources are planned to be available, for example, a planned outbound calling campaign. However the cost of making outbound calls and converting them to inbound calls for agents to pick up from queue is significantly higher than handling inbound calls. It is possible that the numbers of visitors proactively engaged plus the normal inbound call flow exceeds the capability of current resources to handle the calls resulting in longer waits in queue and dropped calls.

Therefore, what is clearly needed is a system and methods for managed inbound routing, inviting persons, such as Web visitors and IVR visitors to accept call in reservations whereby they may call into the center according to a schedule that takes into account predictive statistics about call loads and predictive statistics about resource availability. Such a system would allow that resources would most likely be available to handle the calls without forcing callers to wait in queue.

SUMMARY OF THE INVENTION

The problem stated above is that in a call center environment it is desired that call center resources including live agents be made available to potential customers that are detected online at the center Web site or in interaction with a center voice application or Interactive Voice Response (IVR) system in a manner that provides live engagement without long waiting times. However, the current means for proactively engaging a potential customer in real time such as by providing a toll free inbound line to call also add to the existing call load at the center straining available resources.

Further to the above, placing outbound calls to potential customers is more expensive than having the customers call into the center and requires a more complicated routing effort. Adding inbound calls proactively including immediate or scheduled callbacks to the current flow of inbound calls to a call center can be problematic in terms of guaranteeing that enough resources will be available to answer such calls without excessive time in queue.

The inventors therefore considered functional elements of a call center platform, looking for elements that exhibit superior integration properties that could potentially be harnessed to provide services to customers who were proactively engaged, but in a manner that would not hinder call flow or tax available resources.

Every call center depends on sustainable call flow, available resources, and timely call handling to get the most cost efficient utilization of resources including live agents during the peak and wan periods of business each work day.

Interaction monitoring, proactive engagement, and visitor ranking are typically part of such methods for increasing sales opportunities for the call center.

The present inventors realized during an inventive moment that if at the point of proactive engagement, potential call center customers could be proactively invited to call into the center at a later time in the fashion of a reservation or appointment when predicted call flow is lower and resources are readily available, significant call load distribution normalization might result along with increased sales opportunities.

The inventors therefore constructed a sophisticated system that allowed for proactive engagement of potential customers in a manner that considered predictive analysis of future call flow and resource availability whereby calling opportunities could be reserved for periods during the work day where lower call flows and higher resource availability was predicted. A significant call flow balancing results with no strain on available resources or long waits for customers in queue for assistance.

Accordingly, in an embodiment of the present invention, a method for providing inbound call reservations to a communication center is provided, comprising the steps of (a) monitoring service access points into the communication center by reservation software executing from a machine-readable medium; (b) evaluating communicators and potential communicators; and (c) and issuing invitations for reserved communication sessions to qualified communicators and potential communicators, the reserved times coordinated according to data pertaining to predicted communication load and resource availability statistics.

In one embodiment in step (a) the service-access points include a Web form or electronic information page. Also in one embodiment in step (a) the communication center service-access points include an interactive voice response unit. Further in one embodiment in step (c) resource availability statistics include estimated waiting time in queue.

In some embodiments the reservation software interacts with communicators and potential communicators in evaluation and stores interaction parameters, which are associated in the data store with an inbound call reservation for later retrieval during call routing of a reserved inbound communication. Evaluation may include history of Web page navigation or Web form interaction. Also, evaluation may include interactive voice response interaction.

In many embodiments issued inbound communication reservation includes a confirmation number. In some cases the software includes a mechanism for canceling or rescheduling an inbound communication reservation based on a change in predictive load or agent availability statistics for the reservation time of the inbound communication. In some cases the system includes a facility for issuing one or more alerts to a person for whom an inbound communication has been scheduled.

In another aspect of the invention, a system for providing inbound communication reservations to a communication center is provided, comprising reservation software executing from a machine-readable medium, and a data storage storing data pertaining to communication reservations and data pertaining to predicted load and resource availability statistics, wherein the reservation software monitors service-access points into the communication center, evaluates communicators and potential communicators, and issues invitations for reserved communications to qualified communicators and potential communicators.

In one embodiment the service-access points include a Web form or electronic information page. Also in one embodiment the service-access points include an interactive voice response unit. Resource availability statistics may include estimated waiting time in queue.

In some embodiments the reservation software interacts with communicators and potential communicators in evaluation and stores interaction parameters, which are associated in the data store with an inbound reservation for later retrieval during routing of a reserved inbound communication.

In some embodiments evaluation includes history of Web page navigation or Web form interaction. Also in some embodiments evaluation includes interactive voice response interaction. In many embodiments an issued inbound reservation includes a confirmation number.

In some cases the software includes a mechanism for canceling or rescheduling an inbound reservation based on a change in predictive load or agent availability statistics for the reservation time of the inbound communication. Further, the system may issue one or more alerts to a person for whom an inbound call has been scheduled.

DETAILED DESCRIPTION

The inventors provide a unique system and methods that enable scheduled proactive engagement of potential customers in a manner that considers predictive analysis of future call flow and resource availability, whereby calling opportunities are reserved for periods during the work day where lower call flows and higher resource availability are predicted. A significant call flow balancing results with no strain on available resources or long waits for customers in queue for assistance. The present invention is described in enabling detail in the following examples, which may represent more than one embodiment of the invention.

Figure 1:
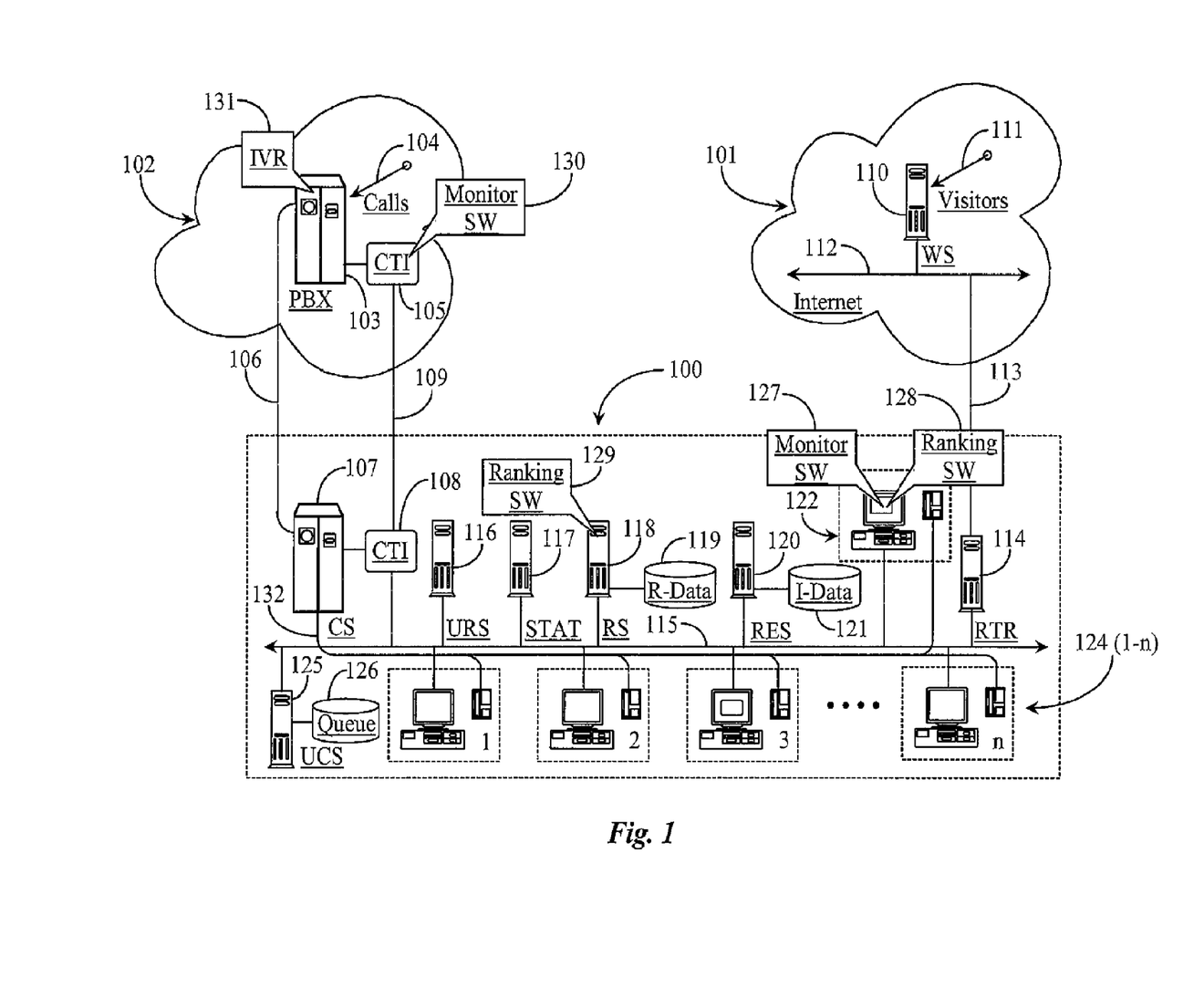
FIG. 1 is an architectural overview of a call center practicing proactive inbound call reservation according to an embodiment of the present invention.

FIG. 1 is an architectural overview of a call center 100 practicing proactive inbound call reservation and scheduling according to an embodiment of the present invention. Call center 100 is typical of many call centers in that it is a dually-capable center, meaning that the center may process interactions sourced from a connected telephone network like a public switched telephone network (PSTN) 102 and interactions sourced from a connected wide-area-network like Internet network 101, both illustrated in this example logically using network cloud icons. Networks 101 and 102 are illustrated as physically separate from one another in this embodiment, however one with skill in the art of network communication will appreciate the physical ambiguity between the two networks in actual practice.

Call center 100 includes a local area network (LAN) 115 adapted in this example with transfer control protocol over Internet protocol (TCP/IP) and other network protocols required to enable LAN 115 as a connected sub-network of Internet network 101. LAN 115 supports an IP router (RTR) 114 having connectivity to an Internet network backbone 112 by way of an Internet access line 113. A variety of Internet connection techniques may be utilized to connect LAN 115 to Internet 101, including direct T-X connectivity on a 24/7 basis, broadband, wireless, digital subscriber line (DSL), Wireless Fidelity (WiFi) and so on. An Internet service provider (ISP) not illustrated may also be assumed present in this example in cases where service is brokered through a third party provider.

Call center 100 functions to service interaction on behalf of one or more enterprises and provides third-party call center services to customers of those enterprises including, but not limited to sales and servicing of clients that patronize the one or more enterprises represented by the center. Backbone 112 in Internet 101 represents all of the lines, equipment, and connection points that make up the Internet network as a whole. Therefore there are no geographic limitations to the practice of the present invention.

Backbone 112 supports a Web server (WS) 110 adapted to serve electronic information pages known in the art as Web pages typically maintained in the server as hypertext transfer protocol pages addressed by universal resource locator (URL) for electronic access by users operating Internet capable appliances. An enterprise represented by call center 100 may maintain one or more Web sites having one or more associated Web pages in WS 110 that are accessible to the general public represented by an arrow labeled visitors with the element number 111. Visitors 111 represent any users accessing one or more Web pages of an enterprise served by call center 100. Such visitors may operate desktop computers, smart telephones, personal digital assistants (PDAs), laptop computers, or other Internet capable appliances. Generally speaking, an enterprise represented by call center 100 and having a Web site accessible through WS 110 is a commercial enterprise engaged in sales and service to a customer base.

The Web site maintained by such an enterprise as described above may include a commercial page where customers may browse products and services and make online purchases. Other customer interfacing pages may also be present in an enterprise Web site such as a forum, a technical service page, an account management page, a registration page, a login page, a general contact page, and other informative Web pages that explain the benefits of products and services offered.

Call center 100 maintains a central office switch (CS) 107 within the call center physical domain. CS 107 may be an automated call distributor (ACD) type switch or a private branch exchange (PBX) switch or some other suitable switch capable of processing telephone calls. CS 107 is computer telephone integrated (CTI) by a connected CTI processor 108 connected to the switch by a CTI link. CTI processor 108 provides intelligent call processing control to switch 107. CS 107 has connectivity to a local network switch 103 in PSTN 102 by way of a telephone trunk 106. Switch 103 is a PBX switch in this example and is enhanced for call processing control intelligence by a CTI processor 105 maintained by the call center at network level. CTI processor 105 has a CTI link to PBX 103 in the network.

CTI processor 105 at switch 103 and CTI processor 108 at switch 107 are connected to one another by a separate digital network 109. In this way intelligent call control features are extended into the network cloud from call center 100. CTI processor 108 is connected to LAN 115 within call center 100. In this way information solicited from callers registered at switch 103 can be routed over LAN to agents before internal calls are routed to them. PBX 103 includes an instance of interactive voice response (IVR) 131 adapted to interface with callers that call into call center 100 using some provided number such as a toll free 1-800-number registered at switch 103. Calls into switch 103 that are destined for call center 100 are represented herein by a directional arrow labeled calls with the element number 104. Due to the seamless nature of network bridging, calls into switch 103 may source from anywhere in a connected telephone network or from anywhere in Internet 101 such as by using voice over Internet protocol VoIP).

CS 107 is connected to internal call center telephones by way of internal telephone wiring 132. LAN 115 supports several agent workstations illustrated herein as stations 124 (1-$n$). Each agent workstation 124 (1-$n$) has a computer appliance and a telephone. Agent workstations 124(1-$n$) are manned by live call center agents who handle interactions incoming into the call center through call center access points switch 103 and switch 107 or WS 110. Agents may handle voice calls, Email requests, and may also engage customers through a chat interface or an instant message interface. More equipment may be present within the agent workstations without departing from the spirit and scope of the present invention. In this example, each telephone in agent workstations 124 (1-$n$) has a connection to switch 107 via internal telephone wiring 132. Each computing appliance illustrated in this example is LAN connected.

Digital interactions may be routed to agents operating at stations 124 (1-$n$) through RTR 114 or via separate CTI network 109. Calls incoming to center 100 are intercepted at switch 103 by IVR 131 before being forwarded to switch 107 for final destination routing. Utilizing IVR services at the network level allows for agent level routing occurring at switch 107. In one embodiment CTI and IVR enhancement is provided in switch 107 instead of at switch 103 within PSTN 102.

A Web page belonging to a company Web site may include contact options that users may launch or initiate from the Company Internet site. For example, a floating or static contact interface may be provided within a contact page or other Web page that contains several options for users to engage call center resources. Typical options include email, chat, and scheduled call back options. In some cases an inbound toll free number is provided for placing an immediate inbound telephone call into the call center.

LAN 115 supports a knowledge worker station or administrative station 122, which is used in this example to monitor and rank visitors that are visiting a company Web site of a company the center represents. A computer used in station 122 includes a digital medium (not illustrated) for storing data and executable software (SW). A monitoring SW 127 is provided on and executable from station 122. Monitoring SW 127 is adapted to detect visitors that are browsing one or more portions of a company Web site maintained in WS 110. Those visitors who are detected at the Web site by an administrator or knowledge worker at station 122 using monitoring SW 127 are ranked for importance using a ranking SW 128 provided to and executable from station 122. Ranking SW 128 assess the importance of the activity, presence and or other facets relative to the visitor interacting with the Web site. In some embodiments if the visitor is known, information previously compiled by the call center relative to the visitor may be used in ranking the visitor like previous purchase history, or some known demographic such as the annual income of the visitor, or known preferences of the visitor regarding products and services available through the company.

In this example a knowledge worker or administrator operating from computer station 122 with the aid of the SW applications 127 and 128 performs Web monitoring and ranking of visitors to a Web site of a company represented by call center 100. In another embodiment a ranking server running instances of monitoring SW 127 and ranking SW 128 performs Web site monitoring and ranking of visitors automatically.

LAN 115 supports a statistics (STAT) server 117 adapted to compile real-time and predictive statistics relative to call center resource states and operations. STAT server 117 has a digital medium provided therein or made accessible thereto for storing the data and SW enabling server function. Servable statistics may include estimated waiting time (EWT) in queue, actual call load incoming into the center for routing, predicted call loads projected out in time, and actual and predicted availability statistics on resources of the call center, more particularly, live agents.

LAN 115 supports a universal routing server (URS) 116 known to the inventors and adapted to provide intelligent routing instruction upon request to systems like IVR 131 and RTR 114. URS may subscribe to certain statistics to aid in determination of availability for routing interactions. LAN 115 supports a universal connection server (UCS) 125 known to the inventor and adapted to provide a universal record of ongoing and queued interactions of any supported media type as well as to record statistics relative to processing and state of those ongoing and pending interactions. URS 116 and UCS 125 have digital mediums provided therein or otherwise made accessible thereto that contain all of the data and SW to enable server function. A general queue 126 is illustrated in this example and is connected to UCS 125. Queue 126 logically represents interactions that have been routed and are waiting in queue for available resources like live agents for example.

Callers into center 100 that are registered with switch 103 are monitored during the IVR prescreening by a monitoring SW 130 running on CTI processor 105. IVR callers may be monitored for interactive behavior, mood, and, or interactive responses to IVR prompts. The monitoring process detects all of the callers and monitors the interactions of each caller with the IVR. LAN 115 supports a ranking server (RS) 118 that is adapted to rank the importance of callers monitored during IVR interaction by monitoring SW 130 with the aid of a ranking SW 129 running on the ranking server. Ranking server 118 has a digital medium provided therein or otherwise made accessible thereto for enabling server function.

A data repository 119 labeled R-Data for reservation data is provided and connected to RS 118 running ranking SW 129. Repository 119 contains call reservation data relative to reserved call opportunities made available to visitors 111 and callers 104 as a result of favorable ranking. For example, qualified callers 104 interacting with IVR 131 may be offered a call reservation opportunity at a later time if current statistics indicate that there are no available resources within the center to handle the call immediately. Likewise, repository 119 contains call reservations made available to Web visitors 111 who are qualified and where no available resources are available to handle immediate live interaction. In this specification the distinction between callers and visitors is that visitors are accessing a Web-based access point whereas callers are interacting by telephone IVR system. However, in the abstract sense visitors and callers are treated much in the same way through their respective interfaces. Therefore the term visitor may be used in this specification to refer to both callers (IVR visitors) and Web visitors.

LAN 115 supports a reservation server RES 120 adapted to generate and serve call reservations. RES 120 has a digital medium provided therein or otherwise made accessible thereto for enabling server function. In this example RES 120 serves call reservations to RS 118 and RS 118 stores them for confirmation purposes in repository 119. In this example, a data repository 121 labeled I-Data for Interaction Data is provided and connected to RES 120. I-Data repository 121 contains the interaction parameters for the original interaction of each visitor at WS 110 or caller at PBX 103 who has a pending call reservation stored in repository 119. In one embodiment the call reservation data and the interaction data are stored in a same repository and are associated under the identifications of the visitors and callers. The inventors illustrate the data categories separately here for discussion purposes only.

A call reservation is defined in this example as an opportunity to call into call center 100 using a toll free number to place an inbound voice call at a time such that available statistics show that a live agent will be available to handle the call if made at the reserved time window for that call. Like an appointment, a call reservation is scheduled to take place at a certain time or within a certain time frame where the visitor or caller dials the number at the scheduled time to connect with a live agent. In current proactive engagement systems, inbound call opportunities are limited to immediate connection with a live agent upon determination by the system that an agent will be there to answer the call. Therefore, the system must take into account predictive statistics to determine when in the future is a good time to schedule an inbound call.

STAT server 117 provides current statistics on agent availability and EWT so Web visitors 111 and IVR-assisted 104 may be routed directly to available resources during their first interactions if those resources are determined available. However, when visitors 111 and callers 104 rank high enough to receive an invitation to reserve an inbound calling opportunity, the reservation is generated only when no resources are currently available and wherein the EWT in queue 126 is relatively high. If an agent is ready to handle a call for a high-ranked caller interacting with IVR 131, for example, then the system would not request a call reservation for that caller and would simply route the caller to a designated agent or to a next-available available agent.

Incoming interaction flow is characterized by peaks and valleys in a state-of-art call centers. There are peak times when EWT in queue is high and there are not enough resources available to handle interactions without long waits. There are valleys in the interaction flow where resources are readily available and no significant wait time exists for live assistance. STAT server 117 maintains predictive statistics that provide a forecast of expected peaks and valleys relative to normal incoming interaction flow.

The present invention provides call reservations that are strategically scheduled based on call flow forecasts. Incoming calls are preferred for a call reservation because they are more economic than callbacks, which are placed by an outbound dialing system and then treated as incoming calls when the customer answers.

When a qualified visitor is detected at the company Web site maintained in WS 110, RES server 120 may be called to generate a call reservation and a call reservation invitation to be pushed to the Web visitor while he or she is browsing the Web site. The invitation may appear to the visitor as a popup screen or other visual notification during the Web session in which the visitor is engaged. The invitation to reserve a call is presented when current resources are not available to handle an immediate call. The visitor has the option of declining or accepting the invitation in one embodiment. If the visitor accepts the invitation by interacting with the invitation a call reservation is recorded and saved for that visitor and the visitor is given a confirmation number.

In one embodiment the call reservation invitation includes the proposed time for the visitor to call into the center, a toll free telephone number to call, and a confirmation number to use to validate the reservation to obtain priority in queue if necessary. In this embodiment a reservation is pre-generated for the visitor and is saved to the system if the visitor accepts the invitation. If the visitor declines the invitation then no action is taken and the generated reservation data is purged. RES server 120 provides a proposed reservation time based on call load and agent availability forecasts such that the proposed time occurs in a valley relative to forecasted call flow into the center. The reservation time is the time when the visitor should call into the center using the toll free number provided. This time can be a point in time or it may be a time window within which the visitor may place the call. The system provides some incentive to the visitor to accept the reservation in one embodiment. The incentive may be a discount on any purchase made during the reserved call.

In one embodiment a visitor is a caller interacting with IVR 131, such as one of callers 104. At certain times callers 104 interacting with IVR 131 experience long wait time because there are no agents immediately available. It is during these periods that callers may be asked if they would like to call in at a scheduled time when agents will be available. An incentive may be offered as well. In this case the call reservation invitation is a voice prompt delivered to the caller. The reservation may be offered only to callers that qualify to receive the reservation. In the case of IVR-delivered call reservations, monitoring SW 130 running on CTI processor 105 monitors callers at IVR 131.

Ranking server 118 may rank monitored callers based on any number of criteria such as caller interaction history, caller identification, caller mood, or other caller voice response characteristics. When ranking SW 129 qualifies a caller, the reservation server may generate a reservation script that is personalized to the caller and that is converted to a synthesized voice prompt by the IVR system. A call reservation confirmation number may also be randomly generated and provided with the voice prompt and emailed to the caller at a later time. All qualified visitors that receive call reservation invitations are asked to accept or to decline the reservation. This is not required, but serves to improve the probability that the visitors will make contact with the center at the scheduled time in their reservation invitation. There is a probability that a caller or visitor who accepted a reservation will not actually call in at the scheduled time or at all for that matter. Asking for acceptance of the reservation and providing other incentives for the visitor or caller increases the probability that the visit5or will call in at the scheduled time.

IVR 131 may be programmed to ask all callers if the instant call is a reserved call. For callers that confirm, the IVR may ask that callers key in or say their call reservation confirmation number. Confirmed call reservations in progress may be given priority in routing such as being placed in the front of the queue. The incoming call reservations are routed much like other incoming calls into center 100. URS 116 is called by the IVR system for routing a call reservation to a live agent. IVR 131 with the aid of CTI processor 105 may search in reservation data repository 119 to confirm a requested call reservation. URS 116 provides routing instruction for a call reservation in progress. Interaction data in repository 121 may be forwarded to an agent that a call reservation is routed to as an incoming call. This data will reflect the state of the visitor (Web) or caller (IVR) as determined when the call reservation was offered to the visitor or caller. The agent picking up the call reservation will receive at least an interaction summary of the last interaction and any other information solicited from caller or visitor during the call reservation interaction.

Figure 2:
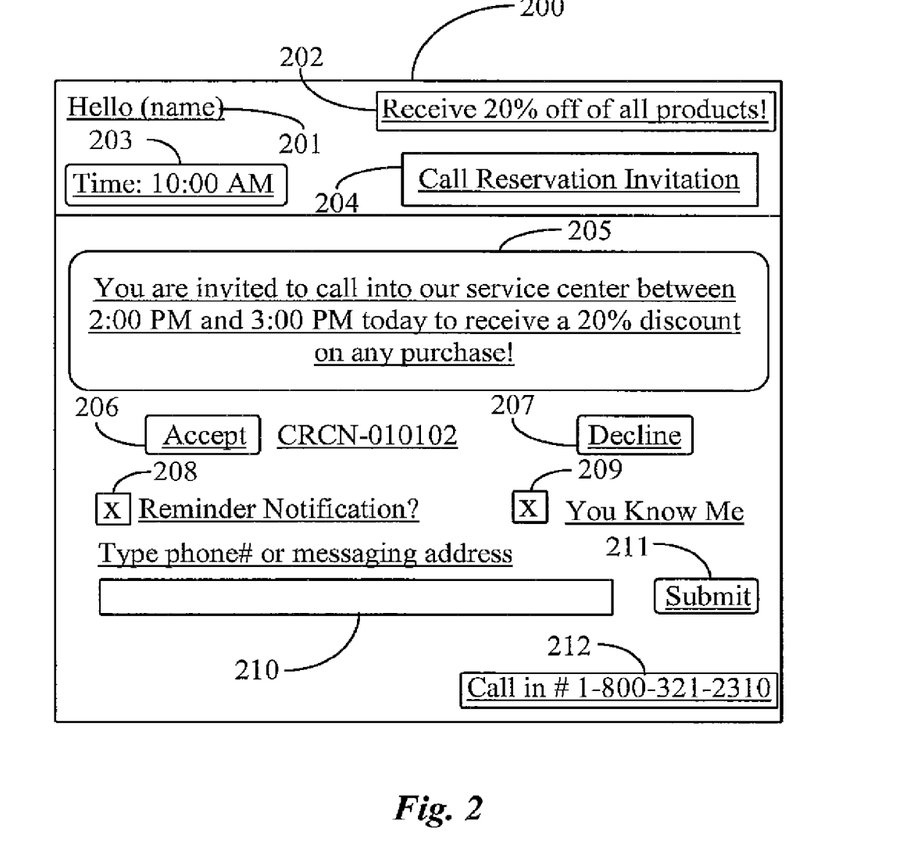
FIG. 2 is an exemplary screen shot of a call reservation invitation according

FIG. 2 is an exemplary display of a call reservation invitation 200 according to an embodiment of the present invention. Call reservation invitation 200 is one that may be served to a visitor interacting with a Web site. Invitation 200 may be a TOAST, a popup, or some other visual indication of a call reservation invitation. Invitation 200 has a title block 204 labeled call reservation invitation. An incentive block 202 is provided to invitation 200. An incentive statement such as "receive 20% off of all products!" can be inserted in block 202. Incentives may be time based such as one incentive rolling over to another based on time of day or some other criteria. Different incentives may be offered to different invitees depending on qualification or ranking. Reservation invitation 200 has a date and time block 203 and a name block 201. The system may provide personalization if the invitee is already known to the system by name.

Invitation 200 includes a message body or window 205. Window 205 may contain the text invitation inviting the visitor to call into the service. In this case the visitor is invited to call in between 2:00 PM and 3:00 PM to receive a 20% discount on any purchase. The visitor may accept the invitation by interacting with an accept button 206. Adjacent to accept button 206 is a call reservation confirmation number (CRCN). A decline button 207 allows the visitor to decline participation. CRCN need not be retained by the system or the visitor if the invitation is declined Invitation 200 may contain a radio button that activates a reminder notification process that will notify the visitor by email or by some other communication that their call reservation is upcoming. A visitor may be able to input the time frame before the scheduled call that is preferred by the visitor to receive a reminder much like reminders implemented by a calendar application. An address field 210 is provided within call reservation invitation 200 and is adapted to receive as input, the telephone number or email address of the invitee to receive the reminder. If the visitor is a client of the enterprise then he or she may check a radio button 209 labeled "You Know Me". The system may look up the contact data from file for that visitor and may confirm with the visitor if the current contact information is up to date before asking for any new contact information.

Invitation 200 has a submit button 211 for sending an acceptance or a declination. If a call reservation invitation is ignored then by default it may be assumed declined in one embodiment. A call in toll free number 212 is provided to invitation 212 as the number to call when the scheduled time arrives. Call reservation invitation 200 may be delivered as a voice prompt to a caller interacting with an IVR by using text recognition and voice synthesis to generate the system invitation voice prompt. The IVR would recite the relevant information from the invitation over the telephone. The actions available on the invitation are represented by the IVR as selectable menu options. In both cases acceptance of the invitation creates a record including the reservation data and any associated interaction data at the time the reservation was made available and accepted by the caller.

Figure 3:
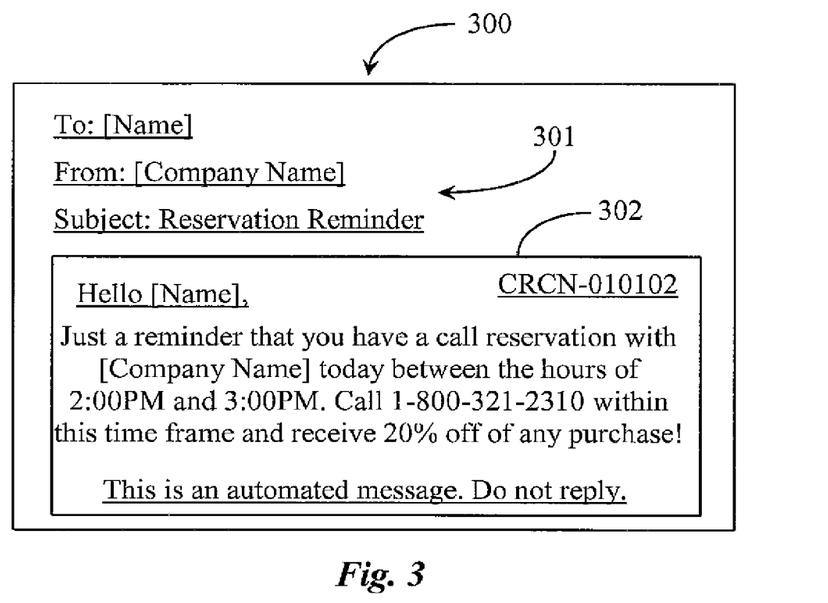
FIG. 3 is an exemplary screen shot of a call reservation reminder notice according to an embodiment of the present invention.

FIG. 3 is an exemplary display of a call reservation reminder notice 300 according to an embodiment of the present invention. Notice 300 is a call reservation reminder notice resulting from interaction with the call reservation notice of FIG. 2. Any invitee who elects to receive a reminder of a scheduled reservation may receive notice 300 as an automated email message or some other form of communicated reminder or alert.

In this example, reminder notice 300 is an automatically generated message such as an email or SMS message. Notice 300 contains an address block 301 containing a "to" line, a "from" line, and a subject line. Reminder notice 300 contains a message window 302 in which the reminder message is inserted in a personalized way. The reminder contains all of the particulars of the reservation including the time and date to call, the CRCN (010102), and the incentive reminder. In one embodiment the reminder notice may be delivered to a visitor as an automated telephone message. In this case it is an automatically generated email or SMS message. In one embodiment an invitee or the inviting company may generate and send a request for changing the time and, or date of a call reservation.

Figure 4:
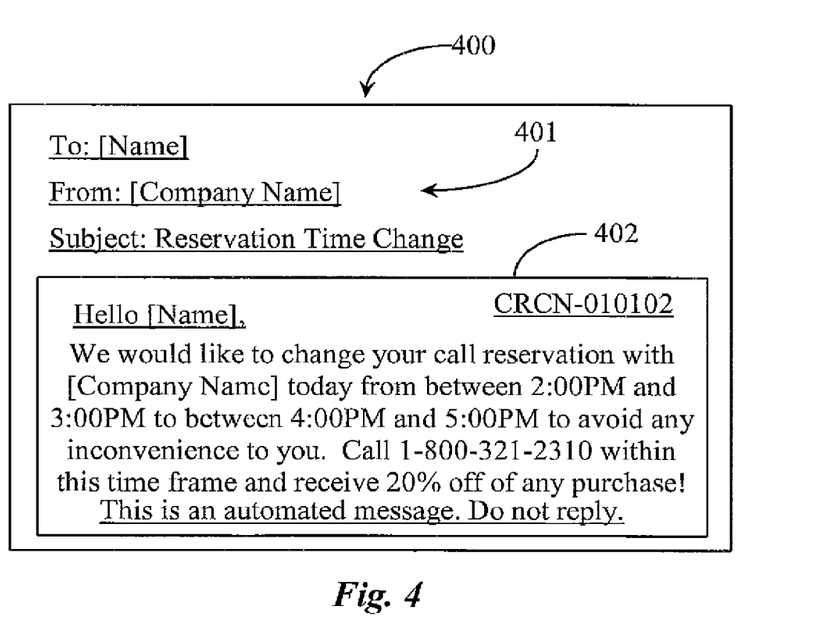
FIG. 4 is an exemplary screen shot of a company request to reschedule a call reservation according to an embodiment of the present invention.

FIG. 4 is an exemplary display of a company request 400 to reschedule a call reservation according to an embodiment of the present invention. Request 400 may be of the form of an automatically generated message such as an email message or a telephone message. Request 400 includes an address block analogous to block 301 of FIG. 3 including a to, from, and subject line. Request 400 has a message window 402 within which all of the particulars of the requested change are inserted as text. The change may confirm the original time and request a new time.

A call reservation change request may be initiated should predictive statistics related to resource availability change at the scheduled time of a reservation. The requested change offers the same discount incentive and explains that the change is required to avoid any inconvenience to the potential customer such as a long wait in queue. In one embodiment the change request may be a message that one may reply to and may include an acceptance button or a declination button, as does the original call reservation invitation. In this case a declination received back from the invitee may be regarded as a cancellation of the reservation. An acceptance results in a rescheduling of the original reservation and any ordered reminder notice. In one case, a declination does not cancel the original invitation and the original call reservation and incentive offered will be honored at the original time.

Scheduled call reservations are incoming calls when executed and are blended in with other incoming calls into the call center. Reserved calls may enjoy priority over normal incoming calls, but some of the reservations may be changed to help balance overall call load into the center. For example, during peak periods some incoming callers and Web visitors are offered reservations thus taking some load off of the peak time. The reservations are scheduled during predicted slack times where lower call loads are predicted whenever EWT in queue increases over an acceptable level, the system may begin offering reservations to qualified callers and visitors. During predicted wan periods when the center is processing both reservations and normal calls, some reservations may be changed if EWT in queue becomes too high based on some threshold time period. In this way call load is redistributed over time to smooth out the peaks and valleys in the overall call load. Call reservation scheduling statistics may also help to plan for available resources.

Figure 5:
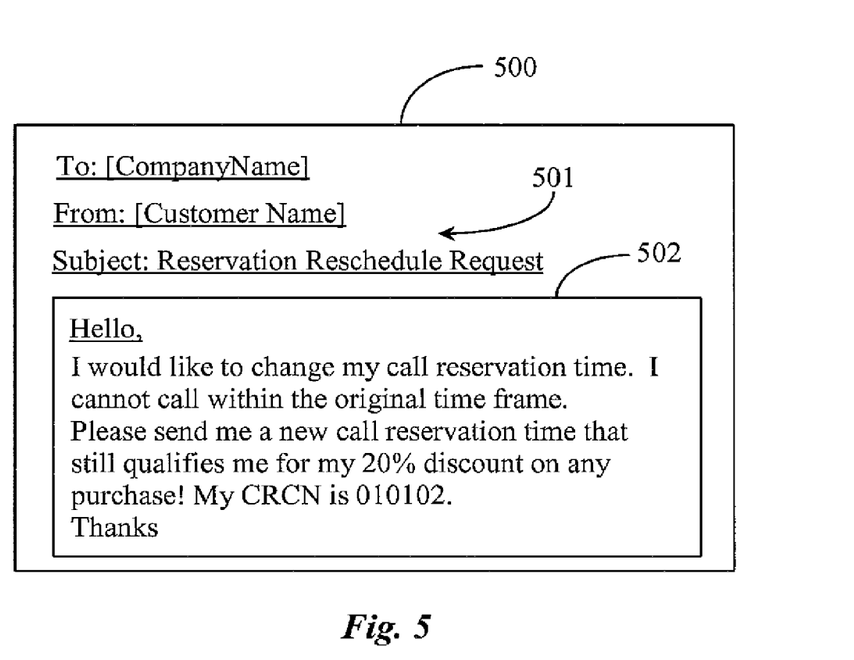
FIG. 5 is an exemplary screen shot of a customer requests to reschedule a call reservation according to an embodiment of the present invention.

FIG. 5 is an exemplary display of a customer request 500 to reschedule a call reservation according to an embodiment of the present invention. In one embodiment of the present invention the potential customer who has received and accepted a call reservation invitation may have the flexibility of requesting another time for the reservation. A customer may originate request 500 as an email message or SMS sent to a company messaging address set up for the purpose. Request 500 has an address block 501 including a "to" line, a "from" line, and a subject line. The customer types in the request text in a provided message window 502.

The request template may, in one embodiment, be provided by the enterprise or call center hosting the system. The request text may be partially controlled by the center such that the customer is aware of what has to be in the message. For example, the confirmation number should be included so the system may look up the reservation. In this example, the invitee may request a time change but may not pick the time. If the call center can reschedule the invitation, a reply notice will be sent back to the customer informing the customer of the new reservation time and date. It is noted herein that change requests may be telephoned into an IVR and handled automatically without using a live operator.

Figure 6:
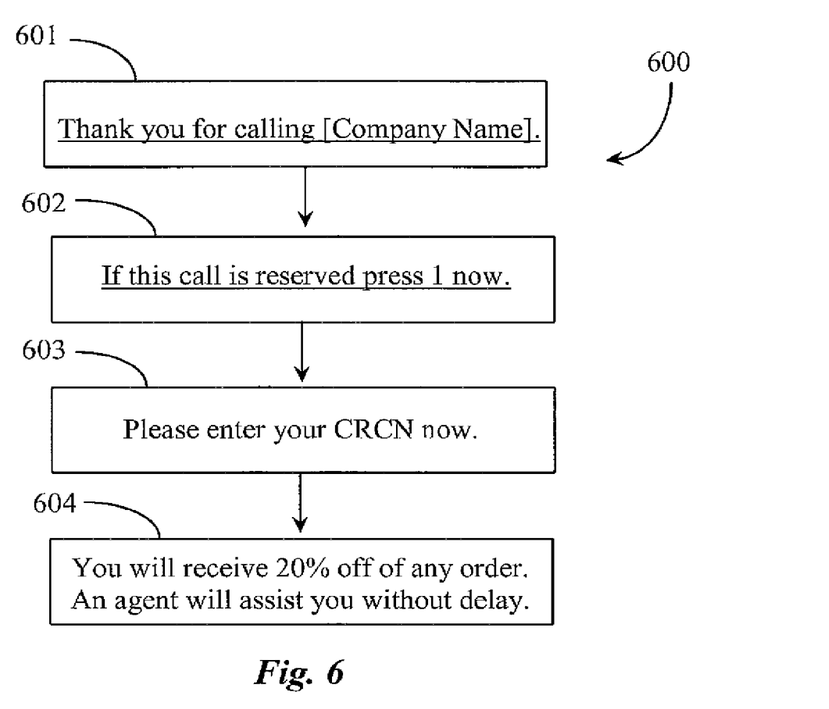
FIG. 6 is a process flow chart illustrating a voice prompt sequence for routing a customer executing a call reservation according to an embodiment of the present invention.

FIG. 6 is a process flow chart illustrating a voice prompt sequence 600 for routing a customer executing a call reservation according to an embodiment of the present invention. Call reservation invitations require that the invitee call into the call center using a toll free number or other telephone number provided for the purpose. Unlike a schedule call back, no outbound contact resources are required. A call reservation call is indistinguishable from a normal incoming call unless a special number is provided only to reservation invitees.

When a call comes into the center and is intercepted by IVR, the IVR greets the caller as usual using a voice prompt 601. The IVR may instruct the caller in a voice prompt 602 that if this is a reserved call, press 1 now or say yes. In this way the reserved calls are sorted from typical inbound calls. After responding affirmatively to voice prompt 602, a voice prompt 603 may ask the caller to enter the CRCN. The system then looks up the reservation data to conform or validate the reservation as being one that is scheduled. The system may also retrieve the past interaction history related to the interaction resulting in the call reservation and any other solicited data for forward to the agent selected to handle the reserved call. Once the call reservation is verified, the system may remind the caller of their incentive (20% discount) and inform the caller that they are now being transferred to a live agent in a voice prompt 604. The URS strategy used results in priority treatment for reserved calls and transfers the interaction data with the call notification to the next available live agent working the queue.

Figure 7:
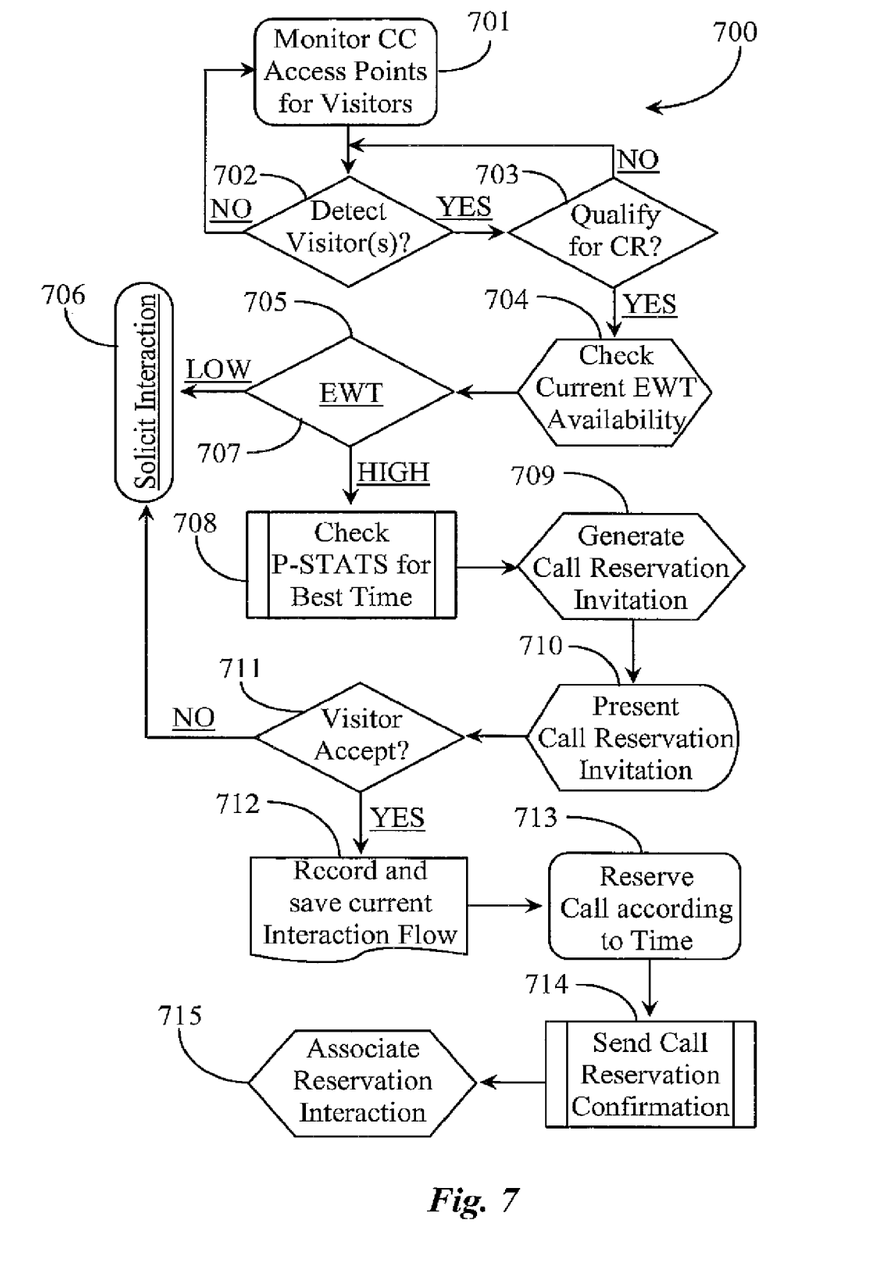
FIG. 7 is a process flow chart illustrating steps 700 for generating and confirming call reservations for potential customers according to an embodiment of the present invention.

FIG. 7 is a process flow chart illustrating steps 700 for generating and confirming call reservations for potential customers according to an embodiment of the present invention. At step 701 call center access points are monitored for visitors. In this step access points may be a Web site and an IVR system although other call center access points might be defined like an email address, a chat room session, or some other point where customers may access call center services.

The system checks if there are one or more visitors at step 702. Visitors may be Web page visitors or callers interacting with an IVR. The process loops back to monitoring if at step 702 no visitors are detected. If at step 702 there are one or more visitors detected, then the process moves to step 703, where the one or more visitors are qualified to receive a call reservation opportunity.

If the one or more visitors are not qualified or fail in ranking at step 703, then no action is taken and the process lops back to detect more visitors. If one or more visitors are qualified to be issued a call reservation notification, then the system checks available statistics in step 704 such as EWT in queue. Even though the caller or visitor qualifies for a call reservation, it is desirable to handle the call immediately when there are enough resources available. At step 705 the system determines the current EWT for each qualified visitor. If the current EWT is low or nonexistent at the time of the call the process moves to step 706 where some other options may be offered to the visitor in lieu of an inbound call reservation. These may be normal solicitations like scheduled call back, email contact, telephone contact, chat invite, and the like.

If EWT is high at step 705, perhaps meeting or exceeding a preset threshold, then at step 708 the system checks predictive statistics for the next best time to schedule a call reservation. The predictive statistics take into account call reservations already scheduled along with predicted call load and resource availability to handle the load. At step 709 the system generates a call reservation invitation utilizing the predictive statistics and information known about the visitor such as the name of the visitor such that the reservation invitation is personalized to the user. At step 710 the call reservation invitation is presented to the visitor. If the visitor is a Web visitor, the invitation may be served to the visitor's current Web session as a popup, a toast, or some other visual invitation screen. If the visitor is a caller interacting with the IVR system then the invitation may be presented using voice prompting.

At step 711 the visitor is given the opportunity of accepting or declining the invitation. If the visitor declines or ignores the invitation at step 711, then the process resolves back to step 706 and the visitor may be treated using other options for interacting with the center including but not limited to automated treatments. If the visitor does not accept the invitation, the generated reservation is purged from the system along with the confirmation number as if it had not existed. If the visitor accepts the invitation at step 711, then the system records and saves the visitor's current interaction flow so that at reservation time the original intent of the visitor and other information obtained about the visitor is preserved and can be forwarded to a handling agent at the time of routing.

At step 713 the generated reservation is scheduled and saved according to the scheduled reservation time or time window. At step 714 the system sends out a call reservation confirmation email containing the reservation parameters and the confirmation number the visitor will use to validate the call at the reservation time. The reservation data is associated with the interaction data and the visitor at step 715. The notification mechanism is automated so that when the reservation time nears, for example, an hour before the scheduled time point or window to make the inbound call, the notification reminder of the reserved call opportunity is automatically sent out from the reservation server.

Other processes may emerge from this basic process without departing from the spirit and scope of the present invention including additional steps for rescheduling a reservation invitation initiated from the host or from the invitee. Rescheduling may be performed on the call center side if predictive statistics change causing a lack of available resources for some of the reserved calls. Reserved inbound calls may also receive priority in queue over normal inbound calls because of a higher probability of making a sale based on the incentive associated with the opportunity. In some embodiments call reservation invitations may be generated for callers or visitors that are seeking technical assistance rather than those seeking to make purchases. In such an embodiment inbound calls seeking technical assistance only may be diverted from all other calls to a reserved time where technical staff is available to handle the reserved calls. There are many different scenarios where reserving inbound call opportunities may be beneficial to managing call load and resources.

Figure 8:
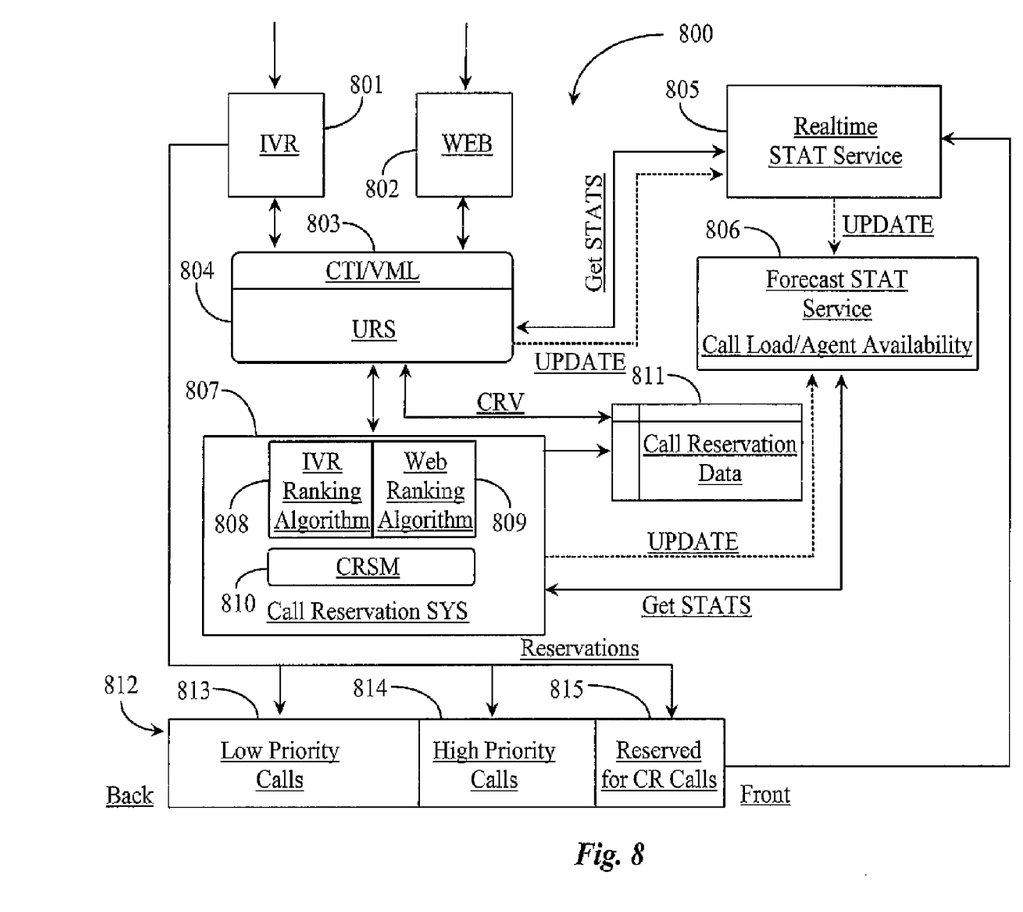
FIG. 8 is a block diagram illustrating basic components utilized in the practice of the present invention and the interaction thereof.

FIG. 8 is a block diagram illustrating basic components 800 utilized in the practice of the present invention and the interaction paths thereof. Incoming visitors to the call center are represented by directional arrows leading into an IVR 801 where the visitors are callers that have dialed into the system by telephone; and leading into a Web server 802 wherein the visitors are users accessing a company Web site hosted by the enterprise or by the call center.

A universal routing server (URS) 804 has a CTI/visitor monitoring layer (VML) 803 that has control and access to IVR 801 and WS 802. In actual practice there may be two separate monitoring and ranking systems, one for telephone and one for the Web. However, one application may be programmed to monitor and rank both types of visitors.

URS has bi-directional communication with a real-time STAT server 805 to get current statistics about resource availability for routing. If there is no issue with EWT in queue and there are resources readily available to handle interactions, the reservation system may not be called into service. However, if the URS determines that EWT is too high to force callers or Web visitors calling in to wait, then the URS may invoke a call reservation system 807 into action for one or more detected visitors whom have not yet been routed. Call reservation system 807 may employ an IVR ranking algorithm 808 and a Web ranking algorithm 809 when ranking visitors. IVR ranking algorithm is programmed to determine qualification for IVR callers. We ranking algorithm 809 is programmed to determine qualification for Web visitors. A call reservation-scheduling module 810 is provided in this example as the unit responsible for scheduling inbound call reservations.

After the system has been running for a period of time, callers entering IVR treatment at IVR 801 may be executing their inbound call reservations. This fact is determined through normal IVR interaction with each incoming caller. Those found to be executing a call reservation are asked for a reservation confirmation number. URS may validate call reservations using call reservation verification (CRV) whereby the URS receives a confirmation number from the IVR system for a caller and checks the number against a call reservation database 811. Incoming calls representing reservations may be routed into a priority queue represented herein as a priority queue 812 along with other inbound calls.

Queue 812 has a front and a back (labeled) and is segmented into three levels of inbound calls. The lowest level is queue segment 813 containing lower priority calls. The next highest level is queue segment 814 where higher priority calls are queued, such calls not being reserved calls. The highest level of queue 812 is queue segment 815 reserved for callers having validated call reservations. Real-time STAT service 805 has constant monitoring access to queue 812 so that the latest EWT STATS are always available for use in routing. In one embodiment URS 804 updates (broken directional arrow labeled UPDATE) the real-time STAT service regularly has it routes interactions.

When real-time statistics indicate a higher EWT above a present threshold then the call reservation service is called in to solicit more reservations. CRSM 810 schedules inbound call opportunities for visitors qualified by algorithms 808 or 809. CRSM 810 has access to a forecast STAT service 806 adapted to forecast future call load and agent availability in this example. For each qualified visitor CRSM 810 accesses forecast STAT server 806 to get STATS for scheduling call reservations. CRSM 810 also updates STAT service 806 when it schedules call reservations (broken arrow labeled UPDATE). Therefore, scheduled call reservations are added to the forecast call load for the periods in which they are scheduled. In a preferred embodiment, all scheduled call reservations that materialize into inbound voice calls are treated with the highest priority. It is not desired that reserved calls come in when there is an issue with agent availability.

In this example, URS 804 with the aid of CTI processor 803 provides call reservation invitations and confirmations. In another embodiment call reservation system 807 serves reservations directly to Web server 802 while URS 804 aided by CTI processor 803 serves the call reservation scripting to IVR 801. Other possibilities exist such as voice application server providing customized voice prompting for IVR use. In this case the voice application server would have access to the call reservation system and would generate voice prompts as required that are personalized to each caller. Service 805 may also update service 806 with actual real-time queue and availability STATS to develop a history that can be used to refine forecasts. In one embodiment a text-to-voice recognition system is used by IVR 801 to generate voice prompts informing callers that they are invited to reserve an inbound call. The confirmation number, caller name, date and time for the reserve3d call and the incentive statement for the reservation may all be read as text then rendered as voice prompting using a standard input voice application template designed for the purpose.

It will be apparent to one with skill in the art that the inbound call reservation system of the invention may be provided using some or all of the mentioned features and components without departing from the spirit and scope of the present invention. It will also be apparent to the skilled artisan that the embodiments described above are specific examples of a single broader invention that may have greater scope than any of the singular descriptions taught. For example, most of the examples described refer to call centers and calls, such as voice calls. The invention is broadly applicable to all sorts of communications into a communications center, such as chat, text message interchange, email, and other forms of digitized and networked communication. There may be many alterations made in the descriptions without departing from the spirit and scope of the present invention. The claims below have been drafted to apply to any and all forms of networked communication.

What is claimed is:

1. A method for providing inbound call reservations to a communication center, comprising:
    monitoring, by a processor, a service access point into the communication center to detect an interaction with a visitor;
    identifying, by the processor, an activity by the visitor during the interaction at the service access point;
    assessing, by the processor, a characteristic of the activity by the visitor;
    ranking, by the processor, the visitor based on the characteristic of the activity;
    evaluating, by the processor, the ranking of the visitor to determine whether the visitor is qualified to receive a reserved communication session based on the ranking;
    storing, by the processor, in a data storage device, solicited information during the interaction with the visitor at the service access point;
    issuing, by the processor, an invitation for the reserved communication session to the visitor in response to determining that the visitor is qualified to receive the reserved communication session, wherein a reserved time of the reserved communication session is coordinated according to data corresponding to predicted communication load and resource availability statistics; and
    associating, by the processor, the issued invitation for the reserved communication session with the stored solicited information in the data storage device for later retrieval for routing an inbound interaction corresponding to the reserved communication session.

2. The method of claim 1, wherein the service access point includes a Web form or electronic information page.

3. The method of claim 1, wherein the service access point includes an interactive voice response unit.

4. The method of claim 1, wherein the resource availability statistics include estimated waiting time in queue.

5. The method of claim 1, wherein the evaluating includes evaluating history of Web page navigation or Web form interaction.

6. The method of claim 1, wherein the evaluating includes evaluating interactive voice response interaction.

7. The method of claim 1, wherein an accepted invitation for the reserved communication session includes a confirmation number.

8. The method of claim 1, further comprising canceling or rescheduling, by the processor, the reserved communication session based on a change in at least one of the predictive communication load and the resource availability statistics for the reservation time corresponding to the reserved communication session.

9. The method of claim 1, further comprising issuing, by the processor, one or more alerts to the visitor for whom the reserved communication session has been scheduled.

10. The method of claim 1, wherein the invitation for the reserved communication session is issued prior to the interaction being associated with a queue.

11. The method of claim 1, wherein the invitation for the reserved communication session includes an incentive to initiate the inbound interaction corresponding to the reserved communication session.

12. The method of claim 1, wherein the ranking is further based on information available about the visitor including at least one of the visitor's mood, interaction history, purchase history, annual income, or product or service preferences.

13. The method of claim 1, wherein the characteristic includes an importance of the activity.

14. A system for providing inbound communication reservations to a communication center, comprising:
a processor; and
memory, wherein the memory has stored therein instructions that, when executed by the processor, cause the processor to:
monitor a service access point into the communication center to detect an interaction with a visitor;
identify an activity by the visitor during the interaction at the service access point;
assess a characteristic of the activity by the visitor;
rank the visitor based on the characteristic of the activity;
evaluate the rank of the visitor to determine whether the visitor is qualified to receive a reserved communication session based on the rank;
store, in a data storage device, solicited information during the interaction with the visitor at the service access point;
issue an invitation for the reserved communication session to the visitor in response to determining that the visitor is qualified to receive the reserved communication session, wherein a reserved time of the reserved communication session is coordinated according to data stored in the data storage device corresponding to predicted communication load and resource availability statistics; and
associate the issued invitation for the reserved communication session with the stored solicited information in the data storage device for later retrieval for routing an inbound interaction corresponding to the reserved communication session.

15. The system of claim 14, wherein the characteristic includes an importance of the activity.

16. The system of claim 14, wherein the service access point includes a Web form or electronic information page.

17. The system of claim 14, wherein the service access point includes an interactive voice response unit.

18. The system of claim 14, wherein the resource availability statistics include estimated waiting time in queue.

19. The system of claim 14, wherein the evaluating includes evaluating history of Web page navigation or Web form interaction.

20. The system of claim 14, wherein the evaluating includes evaluating interactive voice response interaction.

21. The system of claim 14, wherein an accepted invitation for the reserved communication session includes a confirmation number.

22. The system of claim 14, wherein the instructions further cause the processor to cancel or reschedule the reserved communication session based on a change in at least one of the predictive communication load and the agent availability statistics for the reservation time corresponding to the reserved communication session.

23. The system of claim 14, wherein the instructions further cause the processor to issue one or more alerts to the visitor for whom the reserved communication session has been scheduled.

\* \* \* \* \*